R-F HIGH POWER SIMULATION
Filed May 12, 1964
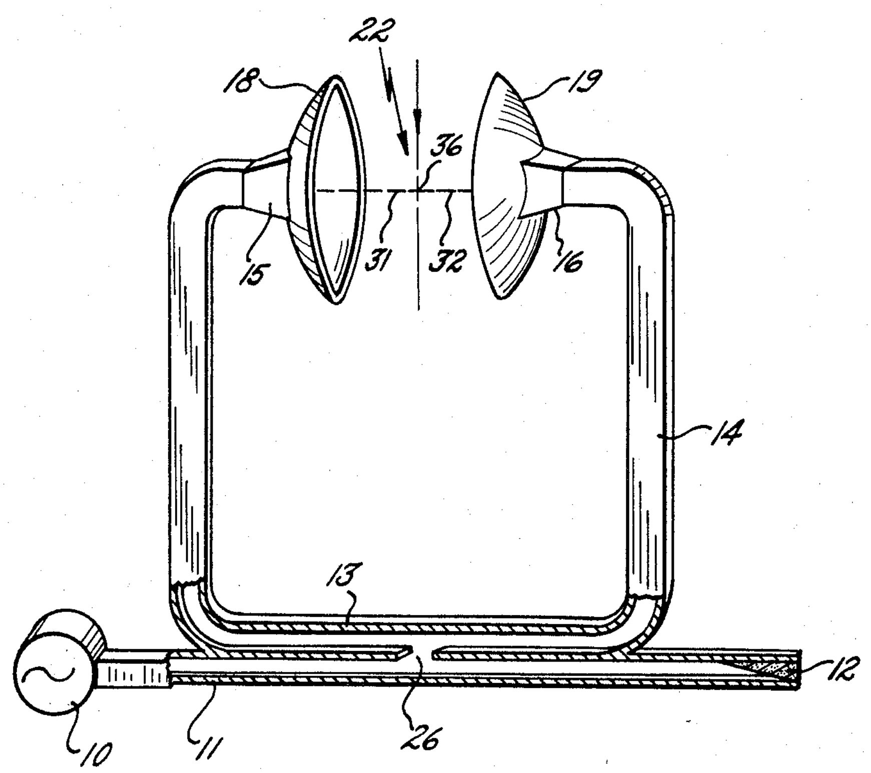
INVENTORS
KENNETH E. NIEBUHR:
AND KENNETH G. EAKIN, DECEASED,
BY MARGARET B. EAKIN,
EXECUTRIX,
BY Wade Koontz
ATTORNEY
Herbert C. Jarmer
AGENT 3,286,208
Patented Nov. 15, 1966

3,286,208
R-F HIGH POWER SIMULATION

Kenneth E. Niebuhr, 637 Crocus Drive, Rockville, Md., and Kenneth G. Eakin, deceased, late of Northfield, N.J., by Margaret B. Eakin, executrix, 297 Neville St., Perth Amboy, N.J.

Filed May 12, 1964, Ser. No. 367,292
4 Claims. (Cl. 333—83)

The invention described herein may be manufactured and used by or for the United States Government for governmental purposes without payment to us of any royalty thereon.

This invention relates to energy directing devices and more particularly to apparatus for testing components and materials at high levels of R-F power under free-space conditions utilizing a traveling wave resonator.

The principle of the traveling wave resonator in the form of a closed transmission line system, frequently referred to as a resonant ring high power simulator, is well known. Such a closed transmission line system, which commonly involves wave guide transmission lines, has been used to generate high power densities within the system from a relatively low power coherent R-F source. A fraction of the energy supplied by the coherent R-F source is coupled, from a feed transmission line leading from said source, into a closed transmission line loop or ring which allows the coupled energy to circulate around said loop in the form of a coherent electromagnetic traveling wave. If said coupled energy is dissipated only slightly by the losses in said loop and the electrical path length around the loop is adjusted to effectively be an integral number of transmission line wavelengths, the coherent energy which is coupled into the loop will constructively add to that coherent energy previously coupled into the loop. The resultant electromagnetic traveling wave circulating around the loop can thus be increased in magnitude until the power density of said traveling wave is many times that provided by the coherent R-F source.

Such a closed transmission line traveling wave resonator has utility in military and industrial research and development laboratories to generate high power densities suitable for determining the effects of high power, particularly power-handling capability, upon materials and devices including transmission line components. However, a disadvantage of such a system is that specimens to be tested must either be positioned within the transmission line loop or made a part of said loop. This necessity restricts the usefulness of the closed transmission line traveling wave resonator, because the ultimate power density achievable is definitely limited by the losses incurred as the traveling wave circulates around the transmission line loop. The loss due to the specimen is a part of said loop loss. Furthermore, the size and shape of the specimen to be tested are restricted by the dimensions of the transmission line.

It is, therefore, a principal object of this invention to provide R-F high power simulator apparatus which will generate coherent R-F high power densities in free-space environment.

It is another object of this invention to provide a R-F high power simulator which will generate coherent high power densities from a relatively low power density, coherent R-F source.

It is still another object of this invention to provide a R-F high power simulator that will generate coherent R-F power densities of a large magnitude in such a way that the particular loss, size, and shape of the specimen is not unduly critical nor highly restricted.

A still further object of this invention is to provide a R-F high power simulator which utilizes well-known, state-of-the-art components so as to be of simple construction and inexpensive.

In carrying out the above objects, this invention comprehends the utilization of two axially-facing antennas in combination with a high power resonant ring simulator. The antennas are located such that the total loop length, including the separation between the antennas, is an integral number of wavelengths; namely, the loop length is made resonant. In this manner, power concentrations many times that normally associated with an R-F power source will exist in the loop, and because of the "free-space" transmission path between said antennas are readily available for high power testing of components and materials.

The invention itself, both as to its organization and manner of operation, together with further objects and advantages thereof, may best be understood by reference to the following description taken in connection with the drawing which illustrates a preferred embodiment of our invention.

Now referring to the drawing, the instant R-F high power simulator operates in the following manner; a fraction of the R-F power from R-F generating source 10, whose power output level and frequency can be controlled, is coupled from its waveguide path 11 to terminating load 12 by terminal coupler 13 and the resonant ring waveguide transmission loop 14. The transmission of R-F power between axially-facing antennas feed horns 15 and 16 completes the resonant ring loop through the "free-space" 22 bounded by paraboloid reflectors 18 and 19.

That is to say an incident wave from source 10 traveling along waveguide 11 has a portion of its energy coupled to waveguide 13 and a portion continues down waveguide 11 as a direct wave to load 12. The coupled wave travels around the loop formed by the waveguide section 14, the pair of axially-facing antennas 15 and 16 and space region 22 between said antennas bounded by paraboloid shells 18 and 19. At couple aperture 26, this energy is again divided, a portion being coupled to load 12 and a portion recirculating around the closing loop. Meanwhile, additional power is continuously being supplied by coherent R-F source 10; thus, if the phase of the portion recirculating around the closed loop is such that it adds to the coupled wave from source 10, the energy in waveguide 14 and in free-space path 22 in the second signal and subsequent signals around the loop will be larger than the first passage around the loop. So, by adjusting the electrical path length around the loop to be an integral number of the operating transmission line wavelengths, the coherent energy which is coupled into the loop is constructively added to that coherent energy previously coupled into the loop. The resonant electromagentic traveling wave circulating around the loop can thus be increased in magnitude until the power density of said traveling wave is many times that provided by the coherent R-F source.

Antennas 15 and 16 must be located near enough so that essentially all the power radiated from one antenna, say 15, will be received by the other antenna, 16, this is accomplished by locating the antennas near enough; namely, less than $D2/\lambda$ where D is the antenna size and $\lambda$ is the operating wavelength.

It is evident that the above-described arrangement accomplishes the principal object of the invention in that a test specimen can be placed in a free-space environment between two similar, axially-facing antennas 15 and 16, and will be subjected to high R-F power density due to the electromagnetic wave circulating in the space region.

While a particular embodiment of the invention has been shown and described, modifications may be made. For example, available power densities can be further enhanced by utilizing focused antenna configurations such as ellipsoidal reflectors, ellipsoidal Cassegrain reflectors, and focused phased arrays. By locating such focused antennas so that they focus on common point 36 between them, extremely high power densities are provided in the vicinity of the common focal point. That is to say, if the sum of the paraboloid focal lengths 31 and 32 is an integral number of half-wavelengths of the R-F signal, the energy reradiated by paraboloid reflector 19 will be in proper phase coherence with energy from primary radiator 15 so that constructive phase interference will occur. Thus, energy is built up between paraboloids 18 and 19 in the form of a traveling wave as the process is continued. It is only necessary that primary R-F source 10 supply more than enough power to make up for losses in the system. The region of highest power density will be in the vicinity of common focal point 36. Still another embodiment could utilize axially-facing, identical, spherical reflectors; in which case the spherical reflectors are spaced to have their center of radius coincident, and again the radius of each curvature must be an integral number of half-wavelengths. The point of coincidence is again the center of the region of maximum power density concentration. These focused phased arrays may be particularly desirable if one wants to more accurately and conveniently control the amplitude and phase across the antenna aperture.

It is to be noted that other waveguides may be utilized; for example, coaxial lines, strip lines or other equivalent types of waveguide structure.

We know it will be obvious to those skilled in the art that other changes and modifications may be made without departing from our invention in its broader aspects. We, therefore, aim in the appended claims to cover all such changes and modifications as being within the true spirit and scope of our invention.

What we claim as new and desire to secure by Letters Patent of the United States is:

1. In an energy directing system utilizing a pair of reflective antenna elements spaced to form a "free-space" environment, the method of providing high R-F densities in said environment comprising the steps of; spacing said two antenna reflective elements in such a manner that the focal points of said reflectors coincide at one central point and have their respective focal distances arranged to conform to an integral number of half-wavelengths of the operating frequency, combining with said antennas a waveguide to form a closed electrical loop having an electrical length substantially equal to an integral number of wavelengths of the frequency of said source, and connecting said closed electrical loop to an exciting radio frequency mechanism to continuously supply power to said waveguide and to said antennas.

2. Microwave high power testing apparatus having a "free-space" testing region comprising; in combination, a pair of axially-facing antennas spaced by a distance equal to an integral number of wavelengths of the operating frequency, a waveguide connected to said pair of antennas to form a closed electrical loop having an electrical length substantially equal to an integral number of wavelengths of the frequency of said source, a coherent R-F source supplying electromagnetic waves to one end of said waveguide, and energy absorbing means connected to the other end of said waveguide.

3. The apparatus as described in claim 2 wherein said antenna elements are paraboloidal reflectors spaced by a distance substantially equal to $D2/\lambda$, where D is the diameter of the larger of the two paraboloids and $\lambda$ is the R-F operating wavelength.

4. The apparatus as described in claim 1 wherein said pair of antennas further comprises antennas of substantially the same size, and each of said antennas has a focal point substantially equal to an integral number of R-F high-wavelengths of the operating frequency to cause high R-F power densities to be present in the free-space vicinity of their common focal point.

No references cited.

HERMAN KARL SAALBACH, *Primary Examiner.*

R. F. HUNT, JR., *Assistant Examiner.*